No. 785,774. PATENTED MAR. 28, 1905.
T. H. STREHLOW.
CLOTHES POLE TIP.
APPLICATION FILED JAN. 23, 1904.
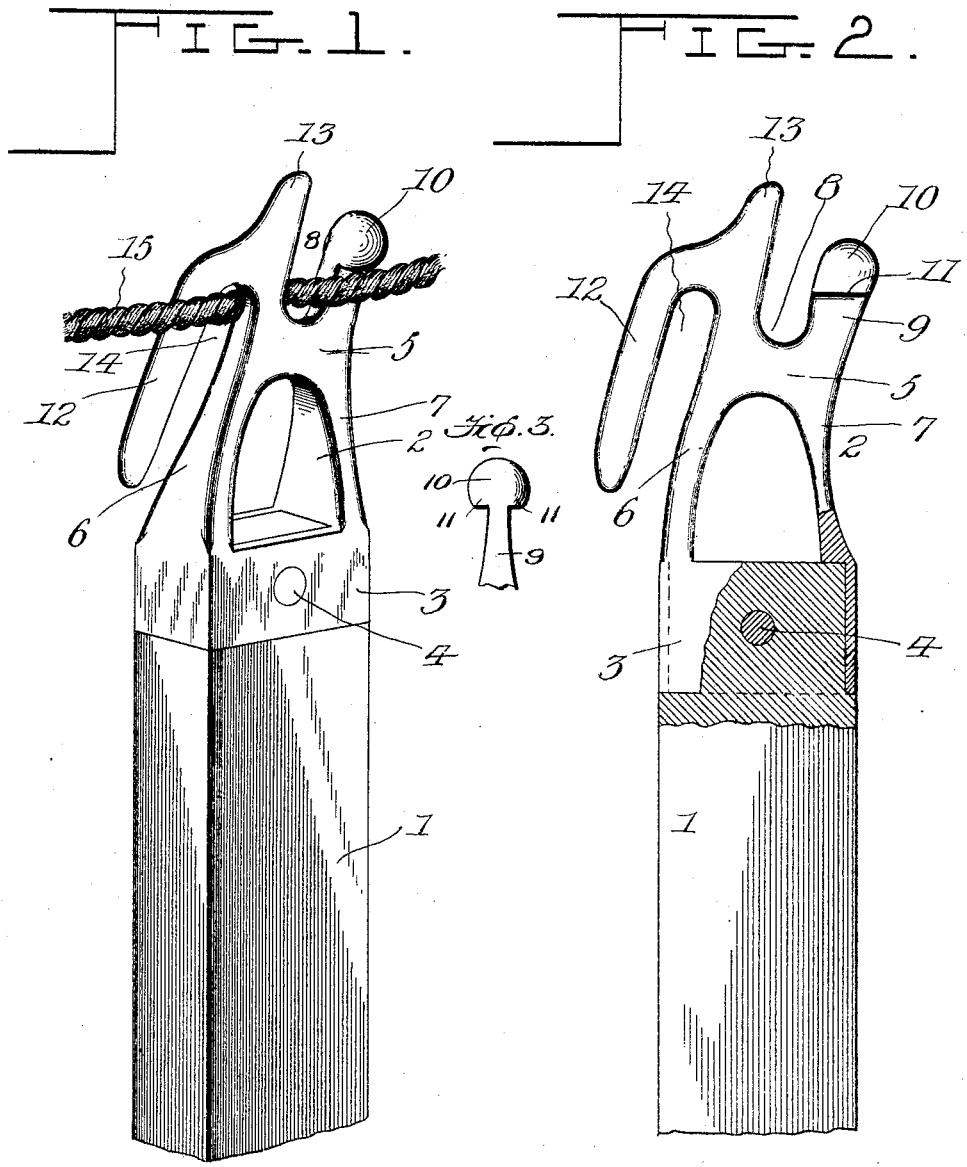
Witnesses: Theodore H. Strehlow, Inventor
By Marion & Marion
Attorneys No. 785,774. Patented March 28, 1905.

UNITED STATES PATENT OFFICE.

THEODORE HENRY STREHLOW, OF CHICAGO, ILLINOIS.

CLOTHES-POLE TIP.

SPECIFICATION forming part of Letters Patent No. 785,774, dated March 28, 1905.

Application filed January 23, 1904. Serial No. 190,417.

*To all whom it may concern:*

Be it known that I, THEODORE HENRY STREHLOW, a citizen of the United States of America, residing at the city of Chicago, county of Cook, State of Illinois, have invented certain new and useful Improvements in Clothes-Pole Tips; and I do hereby declare that the following is a full, clear, and exact description of the invention, such as will enable others skilled in the art to which it appertains to make and use the same.

My invention relates to clothes-line supports; and its object is to provide an improved tip for a clothes-pole of such construction as to prevent the accidental dislocation of the clothes-line from the pole or pole-tip.

The invention consists in the construction and combination of parts to be more fully described hereinafter and definitely set forth in the claims.

In the drawings, which fully illustrate my invention, Figure 1 is a perspective representing the upper portion of a pole provided with a tip constructed according to this invention, a short portion of clothes-line being represented attached to the pole-tip. Fig. 2 is a side elevation of the upper portion of the pole, a portion of this view being broken away and represented in section. Fig. 3 is a detail in side elevation looking from the right of Fig. 2, showing the rudimentary ball and its shoulders.

Throughout the drawings and specification the same numerals of reference denote like parts.

Referring more particularly to the parts, 1 represents the upper extremity of a clothes-pole to which the tip 2 is attached. This tip is preferably formed below with a substantially rectangular socket 3, adapted to receive the upper extremity of the pole, as shown, the said pole being attached by means of a transversely-disposed fastener 4, passing through an opening in the side of the socket 3, as shown.

The pole-tip 2 comprises a body 5, having oppositely-disposed legs 6 and 7, which rise integrally from the aforesaid socket 3 at opposite sides of the said socket, as shown. On its upper edge the said body 5 of the pole-tip is formed with a deep notch or recess 8, adjacent to which the said body is formed into an upwardly-projecting horn 9, said horn terminating above in an enlargement or rudimentary ball 10. In its lower portion the said ball 10 is cut away on its opposite sides, so as to form substantially horizontal shoulders 11, as indicated. As shown in Fig. 2, the axis of the body 5 inclines somewhat to one side, as also does the horn 9. The edge of the body opposite to the horn 9 is provided near its upper portion with an inclined downwardly-projecting spur 12, substantially in the form shown, above which spur the body projects upwardly to form a rounded nose 13, as indicated. Between the spur 12 and the edge of the body 5 a deep notch or recess 14 is shown.

In using the invention the pole-tip would be applied so as to lodge a clothes-line 15 in the same in the manner shown in Fig. 1—that is, with the line passing successively through the notches 8 and 14, it being observed that the bottoms of these notches are so situated as to facilitate such a passing of the line as that suggested. In order to lodge the line 15 in the manner illustrated, the spur 12 would be hooked on the same, and the pole would then be twisted, shoved upwardly, and manipulated so as to get the line into the notch 8. Then the pole would be twisted around, so that an imaginary line joining the horn and spur would extend substantially in the same direction as the clothes-line. When this occurred, the clothes-line would pass under one of the shoulders 11, which would assist in preventing the disengagement of the line from the pole. In this connection it should be stated that it is preferable that the cross-section of the pole should be elongated in the direction in which the clothes-line extends.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A tip for a clothes-pole comprising a body having a socket for attaching the same to a pole, the axis of said body being inclined with respect to the axis of said socket, an integral spur at the edge of said body and projecting downwardly, an integral horn at the opposite edge of said body and projecting upwardly and a nose projecting upwardly between said horn and said spur, said spur and said horn being adapted to receive a line between the same and said body.

2. As an improved article of manufacture, the herein-described clothes-pole tip, the same comprising a body portion having a socket to receive the end of a post, and oppositely-disposed legs rising integrally from the opposite sides of the socket, said body portion being provided with a deep recess on its upper edge, an upwardly-projecting horn having an enlargement and substantially horizontal shoulders upon the under side of the enlargement, the axis of the body and the horn inclining to one side, the said body being also formed integrally at the edge opposite the said horn with an inclined downwardly-projecting spur with an intervening deep recess, and a rounded nose above said spur, all substantially as shown and described.

In witness whereof I have hereunto set my hand in the presence of two witnesses.

THEODORE HENRY STREHLOW.

Witnesses:
E. WELSH,
J. A. COE.